UNITED STATES PATENT OFFICE.

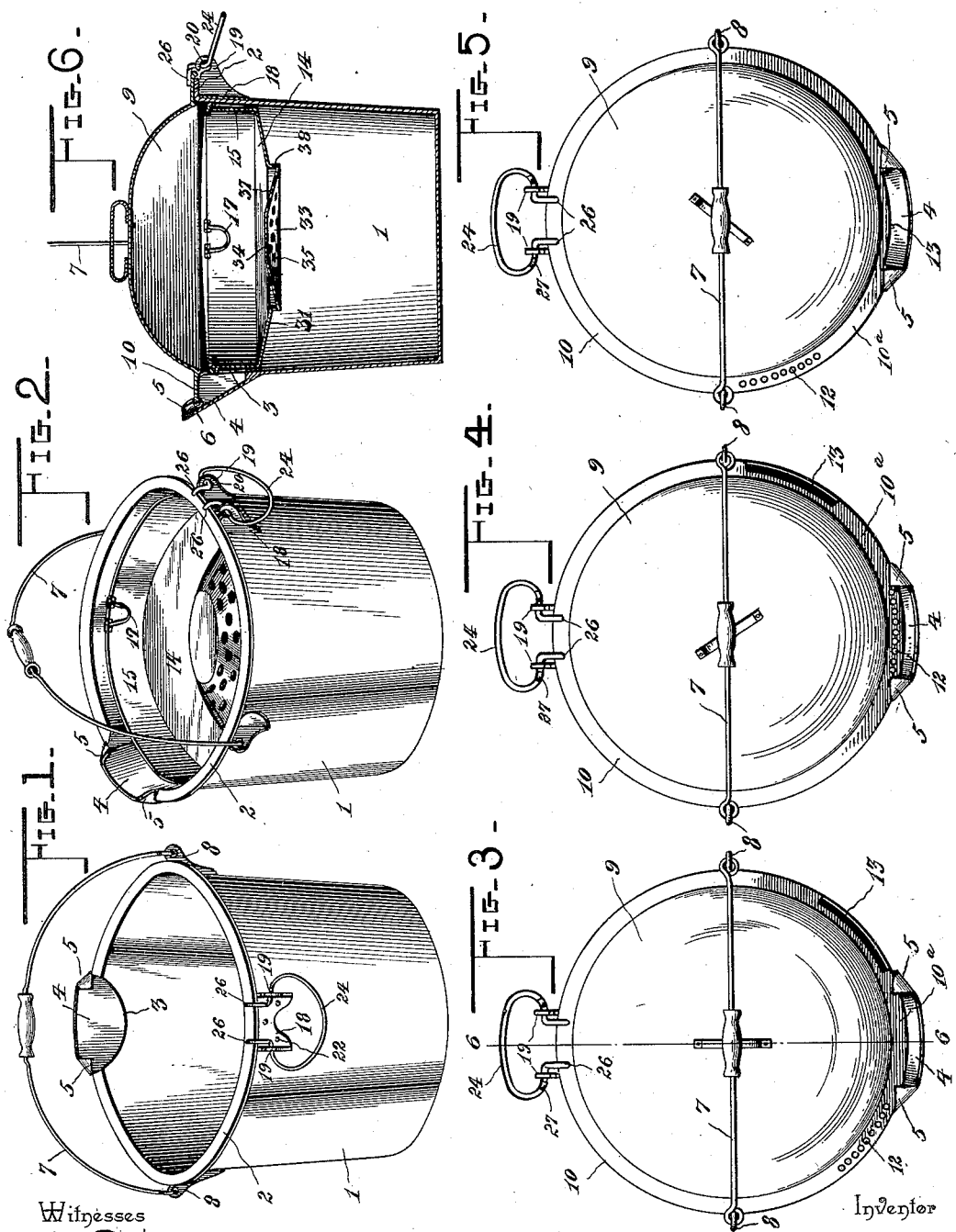

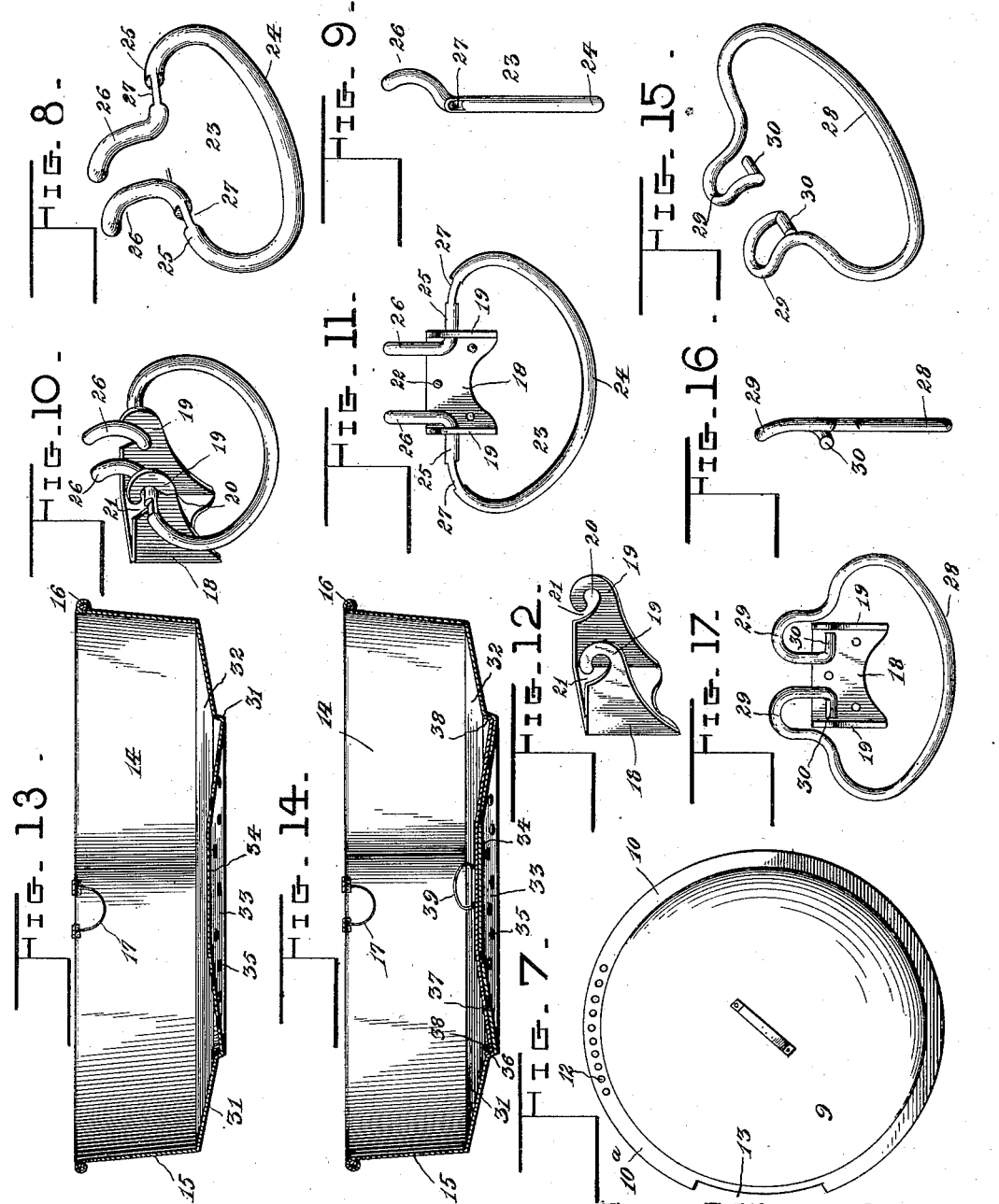

ELMER E. WARD, OF COLORADO SPRINGS, COLORADO.

CULINARY STEAMER AND BOILER.

SPECIFICATION forming part of Letters Patent No. 639,473, dated December 19, 1899.

Application filed August 10, 1898. Serial No. 688,293. (No model.)

*To all whom it may concern:*

Be it known that I, ELMER E. WARD, a citizen of the United States, residing at Colorado Springs, in the county of El Paso and State of Colorado, have invented a new and useful Culinary Steamer and Boiler, of which the following is a specification.

My invention relates to improvements in culinary steamers and boilers for cooking food of that class wherein one kind of food may be steamed while food of another kind may be boiled, or the operation of steaming or boiling may be carried on separately in the apparatus. In a culinary article of this character it is desirable under some conditions to replenish the water in the vessel and to drain off the water from the vessel without removing the cover or the steaming-pan, and also to make provision for keeping the vessel tightly closed in order to reduce the escape of steam to a minimum. It is also desirable to provide means by which the cover may be held securely in place on the vessel and over the steaming-pan when the utensil is tilted or canted in the operation of drawing off the liquid, thus obviating the escape of steam and preventing the operator from scalding the hands in the manipulation of the utensil. It is also desirable to provide a steaming-pan which will expose the contents to heat at the annular rim as well as at the central portion of said pan, and also to provide a pan which may be used to advantage in steaming bread or cake and cooking custards and like foods. These ends are attained in my present invention by a simple and cheap construction of parts arranged for combined operation; and the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a perspective view illustrating the vessel with the cover and steaming-pan removed. Fig. 2 is a perspective view illustrating the steaming-pan in position within the vessel. Figs. 3, 4, and 5 are plan views of the utensil, showing different adjustments of the cover. Fig. 6 is a vertical sectional elevation of the vessel on the plane indicated by the dotted line 6 6 of Fig. 3. Fig. 7 is a plan view of the cover detached. Fig. 8 is a detail perspective view of the operating and clamping handle. Fig. 9 is an edge view of the device shown by Fig. 8. Figs. 10 and 11 are views in elevation and perspective, respectively, illustrating the clamping-handle applied operatively to its supporting-bracket. Fig. 12 is a detail perspective view of said supporting-bracket. Fig. 13 is a vertical sectional elevation of the steaming-pan removed from the vessel. Fig. 14 is a similar view with a false bottom adjusted within the steaming-pan. Figs. 15 and 16 are views in perspective and elevation, respectively, of a modified form of the clamping-handle; and Fig. 17 is a perspective view of the handle shown by Figs. 15 and 16 applied operatively to the bracket illustrated by Fig. 12.

Like numerals of reference denote like and corresponding parts in each of the several figures of the drawings.

1 designates the vessel or pail, which is preferably constructed of sheet metal in any ordinary way known to those skilled in the art. At its upper edge this vessel is formed with an offstanding circular flange 2, which is preferably bent from the vessel to lie at right angles to the circular plane of the wall thereof, and in plan view this offstanding flange is substantially circular. At a suitable point in the annular wall of the vessel and in the offstanding flange 2 thereof is formed a notch or recess 3, (see Fig. 1,) adapted to permit of the passage of water to or from the vessel, and to facilitate the draining of water from the vessel, as well as to provide for conveniently replenishing the liquid contents thereof, I have provided a pouring and filling spout 4. This spout is attached firmly in any suitable way to the vessel, and it is inclined upwardly and outwardly therefrom to lie at an angle to the wall, and said spout is arranged to inclose the notch or recess 3. The upper edge of the spout extends above the horizontal plane of the flange 2, and in plan view this edge of the spout is segmental, so as to lie parallel to the edge of the vessel or pail 1. The upper free edge of the spout terminates on a plane above the circular flange, and the corners or lips 5 at the upper edge of the spout are turned or curved inward to provide the grooves 6, adapted for the reception of a flange on the cover, as will more fully appear from the following description. The vessel is equipped with an ordinary bail 7, loosely connected to the ears 8 to promote the convenience in handling the utensil.

The upper open end of the vessel is designed to be closed when it is in use by a cover 9, preferably of sheet metal, struck up from a single piece in the dished or dome-shaped form represented by the drawings. (See Fig. 6.) This cover is formed or provided with an annular flange 10, which extends a suitable distance beyond the cover proper and is of circular form in plan view. This annular flange of the cover is adapted to rest upon the offstanding flange 2 of the vessel, so as to seat the cover snugly upon the vessel and join the parts together to reduce the escape of steam to a minimum, and said cover is thus seated upon the vessel, so that it may turn or rotate, as upon a vertical axis, in order to adapt the cover for the purpose of straining off the contents of the vessel or of enabling the operator to replenish the liquid contents thereof. This annular flange 10 is formed with a series of transverse apertures 12, of any suitable number, and the length of this series of apertures is substantially coextensive with the length of the spout 4. The cover is further provided with a segmental notch or recess 13, which is situated adjacent to the series of apertures 12, but is separated therefrom by an imperforate short section $10^a$ of the flange 10, the length of this imperforate flange-section $10^a$ being equal to or exceeding the length of the spout 4.

From the foregoing description it will be apparent that the cover 9 may be turned, as upon a vertical axis, to bring the series of apertures 12 or the segmental notch 13 or the imperforate flange-section $10^a$ coincident with the spout 4, according to the desired use of the utensil. When the structure is in service, it is desirable that the escape of steam shall be prevented, and this is attained by adjusting the cover 9 to bring the imperforate section $10^a$ of the flange opposite to or coincident with the spout 4. For replenishing water while steaming and draining the liquid contents of the vessel without removing the cover I have provided the apertures 12 or the notch 13, and to this end the cover may be adjusted to bring either the apertures or the notch coincident with the spout. With the cover in either position to have the apertures or notch coincident with the spout the vessel may be tilted or canted for emptying the liquid contents thereof through the spout, and the apertures and the notch in the edges of the cover provide strainers of different sizes, which permit the liquid to pass, while retaining the solid matters which may be suspended therein.

In my utensil I provide a steaming-pan which is supported or suspended within the upper part of the vessel in a peculiar way, so as to provide for the circulation of steam around the annular wall of the pan in order to expose the contents of said pan to the heat at the edge of the vessel as well as at the bottom of the pan, thus promoting the efficiency of the utensil and insuring thorough cooking of the food contained within the pan. This steaming-pan 14 is provided with an annular wall 15, which inclines inwardly from the face of the pail, as shown by Fig. 6, and the upper edge of said pan is turned or wired, as at 16, to extend the free edge of the pan beyond the line of the lower edge of the pan. This wired edge is adapted to rest upon the vessel or a flange thereof to suspend the pan within the vessel and leave a narrow opening between the lower part of the pan and the annular wall of the vessel, while the space between the vessel and the wall of the pan constitutes a steam-chamber, in which the steam is free to circulate around the pan, thus securing uniform distribution of the heat around the pan as well as across the bottom thereof. On this steaming-pan are provided the loose rings 17, which enable the operator to readily lift the pan from the vessel, and in returning the pan it is adapted to slide into the vessel in a straight line, thus obviating tilting of the pan and spilling the contents thereof.

One of the important features of my invention consists in having the annular beaded flange 10 of the cover fit in the curved grooves 6, which are formed by the lips at the corners of the spout, thus providing for the proper retention of the cover upon the vessel when it is canted or tilted in the act of draining the liquid from the vessel, and to contribute to the security in the retention of the cover upon the vessel I provide a clamping-handle which, in connection with the bail 7, serves as the means for readily lifting and operating the vessel, and said handle also serves, in connection with the spout, to hold the cover firmly clamped upon the vessel, whereby the cover is prevented from displacement in the tilting of the vessel, and the steam cannot escape in such quantities as to scald the hands of the operator. The clamping-handle is supported by a bracket 18, (see Fig. 12,) which is applied and attached to the outside of the vessel 1 at a point diametrically opposite to the spout 4. This bracket is shown as consisting of a single piece of metal having a base-plate and the offstanding parallel ears 19. In these ears are provided the substantially circular journal-openings 20 and the slots 21, which are inclined from the openings upwardly through the edges of the ears 19, the bracket being fastened firmly to the vessel by rivets 22, as shown by Figs. 2, 10, and 11. The clamping-handle 23 is preferably made from a piece of wire, which is bent to form the bail 24, the journals 25, and the arms 26. The journals 25 extend inwardly from the bail, so as to lie substantially opposite to each other, while the arms 26 are curved to lie in a different plane than the bail. In the journals 25, between the bail and arms of the handle, are formed the grooves or recesses 27, which provide short flat lengths in the journals of said handle, and the journals proper are of a diameter to snugly fit in the openings 20 of the bracket, while the flat recessed portions of said journals are of such width as to easily pass through the inclined slots 21 of the bracket. By making the handle of wire it is rendered compressible and expansible to provide for its convenient application to or removal from the bracket and also to retain itself in position by inherent elasticity within the bracket. In attaching the handle to the bracket the arms 26 are drawn together sufficiently for the recessed portions 27 of the journals to be presented to the slots 21 in the bracket-ears, and the handle may then be readily slipped through the slots 21 for the journals 25 to enter the openings 20, after which the arms 26 are released and the handle expands by its elasticity, so as to make the cylindrical journals enter the openings 20. The handle retains itself by inherent elasticity within the bracket, and the journals 25 enable said handle to turn freely within the bracket, as upon a pivot. Viewed as an entirety, the handle is pivoted at a point between its arms and the bail, and the handle when lifted turns the arms 26 into position where they engage with the annular flange 10 of the cover. The handle may be turned on its pivotal connection with the bracket, so as to retract its arms from engagement with the cover, thus freeing the latter for easy removal from the vessel; but when the utensil is lifted by the bail the operator may grasp the handle and bail for the purpose of tilting the vessel, as described, thereby adjusting the handle for its arms 26 to press against the flange and cover and assist the spout in retaining the cover in position against accidental displacement on the vessel.

In Figs. 15, 16, and 17 of the drawings I have represented a modified construction of the handle adapted for use in connection with the bracket, such as shown in Fig. 12. In this embodiment of the invention the handle is made from a single piece of wire to form the bail 28, having the arms 29, and these arms are bent downwardly and inwardly to form the trunnions 30, which are deflected beyond the plane of the bail, whereby the trunnions are adapted to enter the openings of the bracket, while the arms may on upward movement of the handle be presented to the flange of the cover to bind thereon and hold it in place.

In the construction of the steaming-pan shown by Figs. 13 and 14 of the drawings the bottom 31 of said pan is peculiarly formed to provide an imperforate outer section 32 and a perforated central section 33. The outer section of the pan-bottom slopes in a downward and inward direction from the annular wall of the pan toward the center thereof, while the inner section 33 slopes upwardly to the horizontal portion 34. The outer bottom section is imperforate throughout its area; but the upwardly-inclined section 33 has a plurality of openings 35 to provide for the passage of steam freely into the pan. Between the outer and inner sections 32 33 of the pan-bottom is an annular vertical shoulder 36, which forms a seat between the oppositely-inclined sections of the pan-bottom. In steaming certain kinds of food—as, for instance, custards and other soft foods—it is desirable that the openings 35 of the pan-bottom shall be closed to prevent the egress of the food, and to this end I employ the imperforate false bottom 37, which is struck up from a piece of metal in a cross-sectional contour corresponding to the portion or section 33 of the pan-bottom. This false bottom is adapted to conform accurately to the bottom of the pan, and its edge is provided with an offstanding annular flange 38, which is adapted to rest against the annular shoulder 36. The false bottom is thus shaped and proportioned to fit snugly upon the perforated section of the pan, and it is confined in place by the annular shoulder 36, the annular flange 38 of said false bottom serving to exclude the contents of the pan from escaping through the openings 35. The false bottom 37 has a central lifting ring or eye 39 to provide for the convenient removal of said bottom whenever desired.

In the practical service of my utensil it may be used for boiling or steaming foods, either separately or jointly—that is to say, the boiling part of the apparatus may be used without the steaming-pan, and vice versa. The food to be boiled is placed, with a proper quantity of water, into the vessel, and if the utensil is to be used solely for this purpose the steaming-pan is omitted and the cover is seated on the flange and within the groove of the spout, as shown by Fig. 6. In boiling or steaming the food this cover is adjusted to bring the imperforate section of its flange over the spout, thus preventing the escape of steam; but to drain the liquid contents from the vessel the cover is turned to bring either the series of apertures or the notch coincident with the spout, after which the vessel is lifted by the bail, and it is tilted by grasping the handle. This operation of tilting the vessel by the handle operates to move the arms of said handle into engagement with the flange of the cover, whereby the cover is confined between the arms of said handle and the bent lips of the spout. To use the steaming-pan, it is fitted within the vessel in a manner to be suspended in the upper part thereof directly below the position assumed by the cover when it is placed on the vessel and the steam is free to circulate around the annular wall of said pan as well as at its top and bottom. In steaming certain kinds of food, such as bread or cake, the false bottom of the pan is omitted and the steam is allowed to freely enter the pan through the perforations in the central section thereof, while the moisture resulting from the condensation of steam can flow down the annular wall and inclined imperforate section of the pan-bottom to find egress through the perforations in the central portion of said bottom. In cooking soft foods—such as custards, puddings, and the like—the imperforate false bottom is adjusted within the steaming-pan to have its recessed flange fit snugly to the annular collar of the pan-bottom, and this false bottom, in connection with its flange, prevents the leakage and escape of food into the vessel.

Changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. In a culinary appliance, a vessel provided with an offstanding flange and a spout having a groove on or above the plane of said flange, combined with a cover which is fitted to said vessel-flange and received within the grooved part of the spout, substantially as described.

2. In a culinary appliance, the combination with a flanged vessel having a spout, of a cover seated upon said vessel and having a flange which is provided with a notch and a series of apertures, said cover arranged to be adjusted upon the vessel or bring either the series of apertures or the notch coincident with the spout, substantially as described.

3. In a culinary appliance, a flanged cover provided with a series of apertures and a recess or notch separated from the apertures by an imperforate section of the flange which is of a length coincident with the notch or the series of apertures, in combination with a vessel having a spout with which the apertures, the notch or recess, or the imperforate flange-sections may coincide according to the adjustment of the cover on said vessel, substantially as described.

4. In a culinary appliance, the combination of a vessel, a spout having its corners bent or folded to provide retaining lips or flanges which lie above the upper edge of the vessel, a cover having an offstanding flange which is imperforate for the major portion of its length and with one section thereof provided with drain-openings, said cover having its flange fitted on the vessel and across the spout to be held by the retaining-lips of the latter against displacement when the vessel is tilted, and said cover being rotatable to bring the perforated section of its flange over the spout, substantially as described.

5. In a culinary appliance, a means for tilting a vessel and clamping a cover thereto consisting of a bracket having its ears provided with journal-openings and inclined slots, and an elastic clamping-handle provided with arms that lie out of the plane of the grasping portion of the handle and are supported pivotally in the journal-openings of the bracket, said handle being pivoted in the bracket at a point between its hand portion and the clamping-arms thereof, substantially as described.

6. In a culinary appliance, a means for tilting a vessel and clamping a cover thereto comprising a plate having journal-openings and notches of less diameter than said openings and communicating therewith, and a resilient handle provided with the notched journals and the clamping-arms, said journals arranged to fit the openings of the bracket and supporting the handle at a point between its grasping portion and the clamping-arms, substantially as described.

7. In a culinary appliance, the combination with a vessel, of a spout fixed to the vessel and communicating therewith through a notch therein, and a steaming-pan suspended within the vessel and having its wall inclined to the vessel to provide a steam-chamber between the pan and vessel, the recess or opening in the vessel providing for the circulation of steam through the spout and around the suspended pan, substantially as described.

8. In a culinary appliance, a steaming-pan having its bottom, within the annular wall thereof, formed with the inwardly and downwardly inclined, imperforate, drain-section, and with the upwardly-inclined perforated central section, substantially as described.

9. In a culinary appliance, a steaming-pan having its bottom, within the annular wall thereof, formed with the imperforate drain-section around the perforated central section, the two sections of the pan-bottom being inclined reversely to each other, combined with an imperforate false bottom fitted removably within the pan to cover the central perforated section only of the bottom thereof, substantially as described.

10. In a culinary appliance, a steaming-pan having its bottom formed with an annular collar between the reversely-inclined imperforate and perforated sections thereof, and a flanged false bottom fitting snugly to the perforated section of the pan-bottom only and confined within the annular collar thereof, substantially as described.

11. In a culinary appliance, a steaming-pan having its bottom provided with a perforated section surrounded by and inclined reversely to an imperforate section, and an imperforate false bottom fitted removably to the perforated section of the pan-bottom, substantially as described.

In testimony that I claim the foregoing as my own I have hereto affixed my signature in the presence of two witnesses.

ELMER E. WARD.

Witnesses:
E. A. RUNDQUIST,
HARRY WEST.